UNITED STATES PATENT OFFICE.

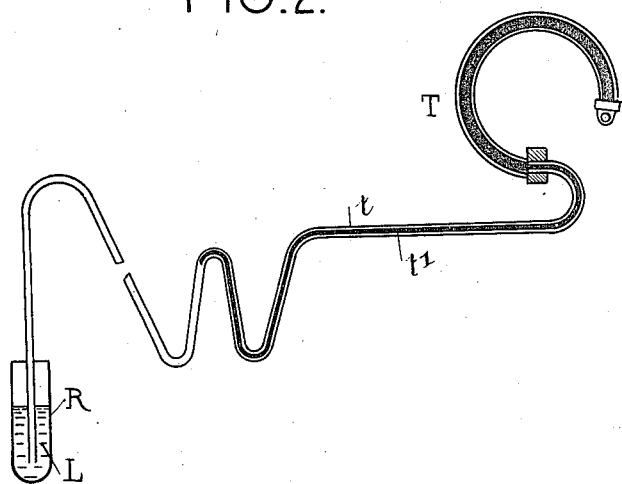
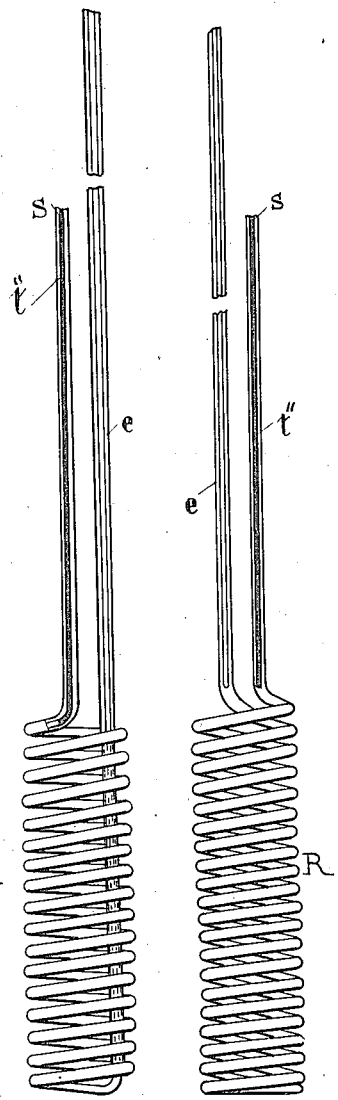
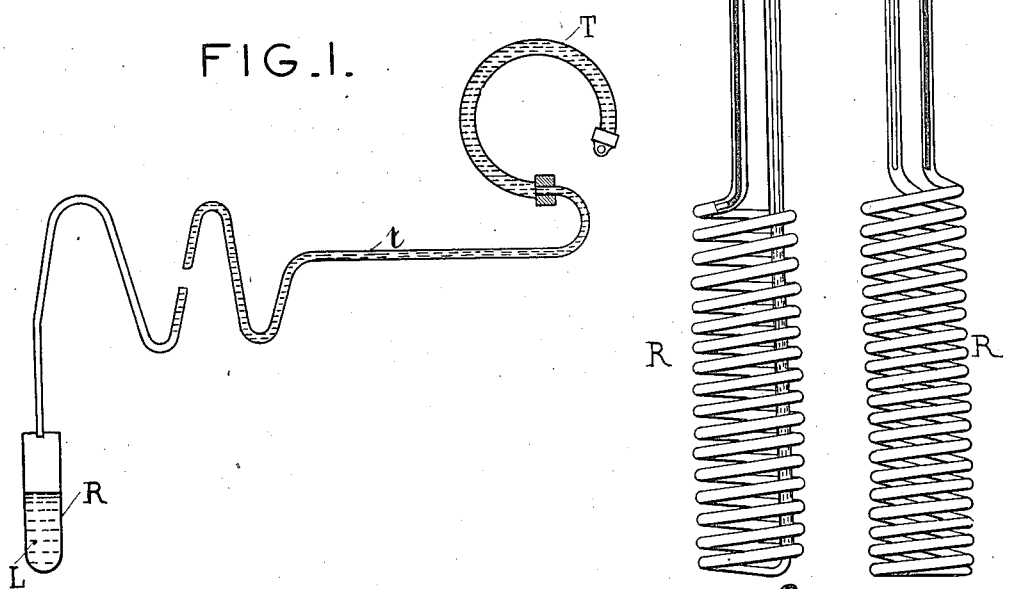

JOSEPH BARBE FOURNIER, OF PARIS, FRANCE.

THERMOMETER.

1,144,649.  Specification of Letters Patent.  Patented June 29, 1915.

Application filed May 12, 1910, Serial No. 560,803. Renewed May 24, 1915. Serial No. 30,254.

*To all whom it may concern:*

Be it known that I, JOSEPH BARBE FOURNIER, a citizen of the French Republic, residing at 11 Rue Campagne Premiere, in the city of Paris, France, engineer, have invented certain new and useful Improvements in Thermometers, of which the following is a full, clear, and exact description.

This invention relates to improvements in thermometers of the type which utilizes the property possessed by every saturated vapor of having one constant vapor-pressure for any given temperature whatever be the volume occupied by this vapor; thermometers of this nature are more especially employed for the purpose of transmitting to a distance an indication of the temperature of the situation or chamber.

Thermometers of this kind are described in the specifications of Letters Patent Nos. 896526, 883159 and 886201. It may be mentioned that the apparatus comprises essentially a vessel or reservoir containing a sufficient quantity of a suitable liquid, such for example as water, to furnish a supply of vapor which is always saturated; this reservoir which is placed in the chamber or space of which the temperature is to be determined and transmitted to a distance, is connected by a tube of any desired length, shape and volume, to an indicating or recording manometer or pressure gage placed at the position where the observation is to be made. The pressure of the saturated vapor contained in the thermometrical reservoir is transmitted to the receiving manometer by means of an inert fluid, either liquid or gaseous, which fills the connecting tube and the receiving manometer. Moreover, the transmitting fluid may consist of the actual liquid which generates the saturated vapor.

Thermometers of this kind may be employed as thermometers properly speaking, either indicating or recording by means of a needle or stylus operated by the receiving manometer tube; they may also be used as thermo-regulators, in which case the manometer tube serves to control a mechanism which regulates the source of heat.

The improvements which form the subject of the present invention relate to an improved method of charging the thermometer reservoir, whereby the latter contains only the sensitive body generating the saturated vapor, and further to a form of construction of the reservoir subjected to the temperature to be measured consisting in forming the reservoir from the transmission tube itself.

The invention consists in charging the apparatus in such a manner that the reservoir contains only sensitive liquid while the capillary transmission tube has its end portion near the reservoir left free for the entrance of liquid or vapor from the latter; the remainder of the transmission tube and the manometer are filled with a transmitting fluid with or without interposition of an inert body. In this way the transmitting fluid is prevented from entering the reservoir to mix with the sensitive liquid therein, by reason of the capillarity of the transmission tube. As a result of this method of charging, not only are the dimensions of the reservoir reduced but also it is rendered more sensitive to heat and stauncher in the sense that it can be made flexible and deformable at will be being formed of the flexible transmission tube itself rolled or coiled in any suitable manner compatible with the application for which the thermometer is intended.

The accompanying drawings illustrate the invention, Figures 1 and 2 being diagrams representing the improved method of charging the reservoir so as to leave therein only the sensitive liquid; Figs. 3 and 4 show various forms that may be given to the reservoir.

Fig. 1 represents a thermometer in which the manometer tube T, as well as a portion of the capillary transmitting tube $t$, has been filled with liquid which is inert in relation to the sensitive liquid L contained in the reservoir R. It will be understood that the transmission liquid may be replaced by a mixture of liquids likewise inert in relation to the sensitive body.

The minimum capacity of the reservoir depends upon the expansibility of the substances contained in the thermometer, so that it is advantageous to employ substances less expansible than liquids; for this purpose solid materials of low expansibility may be introduced into this thermometer. By way of example a metal wire $t'$ of suitable diameter and sufficient flexibility may be introduced into the tube, as represented in Fig. 2. The tightness or ramming of these substances must be such that the pressure of the vapor emitted by the sensitive body can be exerted freely upon all parts of the system so formed; moreover, the materials must not oppose the free movements of the receiving device which is represented as a manometer tube. In certain cases this latter may contain only the transmission fluid, while the solid body mixed if desired with an inert liquid fills wholly or partially only the connecting tube.

In the case of a thermometrical reservoir which controls a plurality of receiving manometers acting as indicating or recording thermometers or thermo-regulators and connected by tubes to this reservoir or coupled in any convenient manner to the flexible connecting pipe or to any suitable point in the system, the charging may be effected in the same way, the part or parts of the flexible tube or tubes adjacent to the thermometer reservoir being unoccupied by either liquid or solid matter for a suitable length. As a development of this method of charging, there is represented in Figs. 3 and 4, the replacement of the reservoir proper by the capillary transmission tube e itself which is coiled in a helix for example.

Fig. 3 shows a portion of the tube e coiled in a single helix to form a reservoir R, this reservoir being coiled around the end of the straight portion of the transmission tube.

Fig. 4 shows the tube coiled in a double helix to form the reservoir R, the two ends of the helix being constituted by the transmission tube e connecting with the manometer and the closed end-portion of the same.

It will be seen that the closure S which closes the extremity of the flexible tube is placed outside or away from the reservoir R (the part directly heated) by its being brought down along the portion of the connection e which immediately precedes the reservoir. Before closing this end of the tube, a solid rod t'' of the exact diameter of the bore of the tube is inserted therein and forced along the tube until it extends as far as the end of the straight portion. The rod is then cut off, and the extremity of the tube sealed in any suitable manner. In this way the reservoir itself is made without a joint and it offers little risk of leakage, because the closure S which closes the extremity of the tube is never exposed to a high temperature.

The reservoir which is formed in this way is flexible and deformable at will; it may take any desired shape according to the requirements of practice, and moreover it presents the great advantage of having a relatively low thermal capacity and it can be arranged in such a way as to have no joints in the directly-heated parts.

Having thus described my invention, what I claim as such and desire to secure by Letters Patent is:—

1. A thermometrical apparatus comprising a flexible capillary tube, an intermediate portion of said tube forming a reservoir, said portion coiled in any manner, said reservoir portion being subjected to the temperature to be observed, said capillary tube having one end free, said free end of said tube being closed, said closed free end being remote from said reservoir, a plug filling said tube adjacent to said closed free end, liquid contained in said reservoir portion, said liquid generating saturated vapor, a manometer, said manometer being in communication with the other extremity of said tube, and means for transmitting to said manometer the pressure in said reservoir.

2. A thermometrical apparatus comprising a flexible capillary tube, a portion of said tube forming a reservoir, said portion being capable of being deformed at will in any manner, said capillary tube having one end free, the free end of said tube being closed, said closed free end being remote from said reservoir, liquid contained in said reservoir, said reservoir subjected to the temperature to be observed, said liquid generating saturated vapor, a manometer, said manometer communicating with the other end of said tube, and means for transmitting to said manometer the pressure in the reservoir.

In testimony whereof I affix my signature in presence of two witnesses.

JOSEPH BARBE FOURNIER.

Witnesses:
 DEAN B. MASON,
 MIGUEL FEROLO.